US007929429B2

(12) United States Patent
Bornstein et al.

(10) Patent No.: US 7,929,429 B2
(45) Date of Patent: *Apr. 19, 2011

(54) OPTIMAL ROUTE SELECTION IN A CONTENT DELIVERY NETWORK

(75) Inventors: Claudson F. Bornstein, Cambridge, MA (US); Timothy K. Canfield, Cambridge, MA (US); Gary L. Miller, Pittsburgh, PA (US); Satish B. Rao, Berkeley, CA (US); Ravi Sundaram, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 307 days.

This patent is subject to a terminal disclaimer.

(21) Appl. No.: 11/858,261

(22) Filed: Sep. 20, 2007

(65) Prior Publication Data
US 2008/0008089 A1    Jan. 10, 2008

Related U.S. Application Data

(63) Continuation of application No. 10/087,033, filed on Mar. 1, 2002, now Pat. No. 7,274,658.

(51) Int. Cl.
*H04J 1/16* (2006.01)
(52) U.S. Cl. .................................. 370/227
(58) Field of Classification Search ............... 370/227, 370/351, 235, 237, 238, 400, 401; 455/556.2, 455/414.1; 709/217, 122; 705/400, 51, 40
See application file for complete search history.

(56) References Cited

U.S. PATENT DOCUMENTS

| 4,345,116 A | 8/1982 | Ash et al. |
| 5,774,660 A | 6/1998 | Brendel et al. |
| 5,774,668 A | 6/1998 | Choquier et al. |
| 5,838,906 A | 11/1998 | Doyle et al. |
| 5,872,930 A | 2/1999 | Masters et al. |

(Continued)

FOREIGN PATENT DOCUMENTS

WO        WO0060861        1/2000

OTHER PUBLICATIONS

Wessels et al, Internet Cache Protocol (ICP), Version 2, Internet Request for Comment (RFC) 2186, Sep. 1997.

(Continued)

*Primary Examiner* — Chi H Pham
*Assistant Examiner* — Alexander Boakye
(74) *Attorney, Agent, or Firm* — David H. Judson

(57) ABSTRACT

A routing mechanism, service or system operable in a distributed networking environment. One preferred environment is a content delivery network (CDN) wherein the present invention provides improved connectivity back to an origin server, especially for HTTP traffic. In a CDN, edge servers are typically organized into regions, with each region comprising a set of content servers that preferably operate in a peer-to-peer manner and share data across a common backbone such as a local area network (LAN). The inventive routing technique enables an edge server operating within a given CDN region to retrieve content (cacheable, non-cacheable and the like) from an origin server more efficiently by selectively routing through the CDN's own nodes, thereby avoiding network congestion and hot spots. The invention enables an edge server to fetch content from an origin server through an intermediate CDN server or, more generally, enables an edge server within a given first region to fetch content from the origin server through an intermediate CDN region.

10 Claims, 4 Drawing Sheets

U.S. PATENT DOCUMENTS

| | | | |
|---|---|---|---|
| 5,920,701 | A | 7/1999 | Miller et al. |
| 5,956,716 | A | 9/1999 | Kenner et al. |
| 5,991,809 | A | 11/1999 | Kriegsman |
| 6,003,030 | A | 12/1999 | Kenner et al. |
| 6,006,264 | A | 12/1999 | Colby et al. |
| 6,052,718 | A | 4/2000 | Gifford |
| 6,078,943 | A | 6/2000 | Yu |
| 6,108,703 | A | 8/2000 | Leighton |
| 6,112,239 | A | 8/2000 | Kenner et al. |
| 6,115,752 | A | 9/2000 | Chauhan |
| 6,119,143 | A | 9/2000 | Dias et al. |
| 6,122,743 | A | 9/2000 | Shaffer et al. |
| 6,144,996 | A | 11/2000 | Starnes et al. |
| 6,154,744 | A | 11/2000 | Kenner et al. |
| 6,167,427 | A | 12/2000 | Rabinovich et al. |
| 6,178,160 | B1 | 1/2001 | Bolton et al. |
| 6,181,867 | B1 | 1/2001 | Kenner et al. |
| 6,185,598 | B1 | 2/2001 | Farber et al. |
| 6,185,619 | B1 | 2/2001 | Joffe et al. |
| 6,243,760 | B1 | 6/2001 | Armbruster et al. |
| 6,256,675 | B1 | 7/2001 | Rabinovich |
| 6,275,470 | B1 | 8/2001 | Ricciulli |
| 6,282,569 | B1 | 8/2001 | Wallis et al. |
| 6,370,571 | B1 | 4/2002 | Medin et al. |
| 6,502,125 | B1 | 12/2002 | Kenner et al. |
| 6,665,706 | B2 | 12/2003 | Kenner et al. |
| 6,754,699 | B2 | 6/2004 | Swildens et al. |
| 6,886,130 | B1 | 4/2005 | Unger et al. |
| 7,054,935 | B2 | 5/2006 | Farber et al. |
| 7,111,061 | B2 | 9/2006 | Leighton et al. |
| 7,136,922 | B2 | 11/2006 | Sundaram et al. |
| 7,240,100 | B1 | 7/2007 | Wein et al. |
| 7,274,658 | B2 * | 9/2007 | Bornstein et al. ............. 370/227 |
| 7,293,093 | B2 | 11/2007 | Leighton et al. |
| 7,603,439 | B2 | 10/2009 | Dilley et al. |
| 2001/0052016 | A1 | 12/2001 | Skene et al. |
| 2002/0010798 | A1 | 1/2002 | Ben-Shaul et al. |
| 2002/0083118 | A1 | 6/2002 | Sim |
| 2002/0107944 | A1 | 8/2002 | Bai et al. |
| 2002/0116444 | A1 | 8/2002 | Chaudhri et al. |
| 2002/0184368 | A1 | 12/2002 | Wang |
| 2003/0187970 | A1 | 10/2003 | Chase et al. |
| 2004/0194102 | A1 | 9/2004 | Neerdaels |
| 2005/0010653 | A1 | 1/2005 | McCanne |
| 2006/0112176 | A1 | 5/2006 | Liu et al. |

OTHER PUBLICATIONS

Wessels et al, Application of Internet Cache Protocol (ICP), Version 2, Internet Request for Comment (RFC) 2187, Sep. 1997.

Anderson et al., Resilient Overlay Networks, 18th ACM Symposium on Operating Systems Principles (SOSP), Oct. 2001.

Savage et al., Detour: Informed Internet Routing and Transport, IEEE Micro, Jan.-Feb. 1999.

Cranor et al., Enhanced Streaming Services in a Content Distribution Network, IEEE Internet Computing, Aug. 2001.

Johnson et al., The Measured Performance of Content Distribution Networks, May 2000.

Kirshnamurthy et al, On the Use and Performance of Content Distribution Networks, AT&T Labs, Aug. 2001.

Lazar et al, Exploring Content Delivery Networking, IT Pro, Aug. 2001.

Wessels, Release Notes for Version 1.1 of the Squid cache, Apr. 1997.

* cited by examiner

OPTIMAL ROUTE SELECTION IN A CONTENT DELIVERY NETWORK

This application is a continuation of Ser. No. 10/087,033, filed Mar. 1, 2002, which application was based on and claimed priority from Ser. No. 60/273,241, filed Mar. 1, 2001.

BACKGROUND OF THE INVENTION

1. Technical Field

The present invention relates generally to finding the best way to route messages between various locations across the Internet while quickly adjusting to changing network conditions.

2. Description of the Related Art

Optimal online performance has become a paramount focus for enterprises seeking to deliver a rich, interactive user experience. As more and more of today's business transactions are conducted via the Internet, companies must make certain that transactions are executed without interruption. Whether it is a purchase form, an online reservation, a customer survey or an information update, the enterprise must have some way to ensure that the transaction is complete.

One way that enterprises have sought to manage and move information effectively via the Internet is through the use of content delivery networks. A content delivery network or "CDN" is a network of geographically distributed content delivery nodes that are arranged for efficient delivery of content on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

While content delivery networks provide significant advantages over prior techniques (e.g., proxy caching and mirroring), their performance is dependent generally on the performance of the Internet, which is far from an ideal communications medium. When a path in the network is either congested or faulty, packets sent over that path can get dropped or delayed. In spite of the existence of less congested paths, Internet routers might not be aware, willing or allowed to use these paths. Economical issues can also interfere with the best routing. Some routers might be configured to route packets using the cheapest route as opposed to the fastest route. Similarly, contractual issues also affect routing: for instance, first tier network providers must talk directly at their peering points and are not allowed to route through an intermediary provider. The peering points themselves often become a bottleneck at certain times of the day.

When a problem occurs on the Internet, it takes a certain amount of time for the routers to converge on a new view of the network, and to decide on the appropriate routing. Possible causes of these problems include router misconfiguration, software and hardware problems, and even fiber cuts. For example, a number of router problems can last about 5 minutes, and then simply go away. An actual misconfiguration can last significantly longer. In December, 2000, a router misconfiguration on a large network caused a large number of other routers to route their traffic to that particular router, thus overloading it. This condition lasted for a few hours, and it caused a significant slowdown on the Internet. A common problem in certain routers can cause partial network unreachability that can last for a few hours and can be very hard to detect. In June, 2001, two network providers stopped peering for administrative reasons. This made hosts in one provider's network simply unreachable by hosts in the other provider's network. This situation lasted for a few days.

In reality, it is not practical to understand all possible Internet problems and reasons why the best route between two points is not always followed. Edge servers operating within a content delivery network often have need to return to a content provider's origin server, e.g., when requested data is not available at the server or is otherwise stale, to obtain non-cacheable content, and the like. While sophisticated CDNs can route around network congestion and other problems, there remains a need to provide improved techniques to optimize the edge server-origin server communication path.

The present invention, in particular, addresses the problem of finding the best way to route data between content delivery network (CDN) regions and content providers, while quickly adjusting to changing network conditions.

BRIEF SUMMARY OF THE INVENTION

It is a general object of the present invention to improve the speed and reliability of data transfers in a distributed networking environment, such as a content delivery network.

It is another general object of this invention to provide techniques for transferring data packets from one node to another node via an intermediate node based on network performance data collected over time.

It is another more specific object of the invention to provide a routing service within a distributed network such as a content delivery network whereby traffic is moved from a first region to a second region by sending it (i.e., "tunneling") through an intermediate region.

It is still another specific object to provide a novel routing mechanism, service or system in a content delivery network. The invention enables an edge server operating within a given CDN region to retrieve content (cacheable, non-cacheable and the like) more efficiently by selectively routing through the CDN's own nodes, thereby avoiding network congestion and hot spots. The invention thus enables an edge server to fetch content from an origin server through an intermediate CDN server or, more generally, enables an edge server within a given first region to fetch content from the origin server through an intermediate CDN region. As used herein, this routing through an intermediate server, node or region is sometimes referred to as "tunneling."

It is yet another more specific object of the invention to provide a routing service that predicts a best path for a data transfer between a source location (e.g., a content provider origin server) and a target location (e.g., a CDN edge server) by analyzing some performance metric common to a set of possible routes. In an illustrative embodiment, the performance metric is download time. In this embodiment, the performance metric is evaluated by having the edge server initiate a file download "race" in response to receiving a request for given content. In particular, a number of simultaneous downloads of the given content are initiated from the source location over a plurality of routes, some of which may include intermediate nodes. The winning path is then used for transfers between the source and the target locations for a given time period (e.g., until the next race).

According to an embodiment of the present invention implemented within a CDN, the identification of the intermediate nodes (and, thus, the alternative routes) to use for the race is determined in an off-line mapping process by performing given network traffic tests. In particular, a map making process operable within the CDN preferably determines the distances between given CDN "core" regions and the content provider, preferably based on ping data (age, loss and latency). The map making process then computes the best one and two-hop paths to the content provider from every CDN datacenter and publishes those paths (e.g., via DNS) as a "map." The usable intermediate CDN servers are typically set on a per content provider basis according to a given content provider policy, which is sometimes referred to as a strategy.

Thus, according to one embodiment of the invention, a map making process (which may be global-based) typically performs given network tests (e.g., pings) and uses the results of those tests to generate a map comprising a plurality of routes: the best route to the customer site, the best intermediate or "middle" region for tunneling, and the next best middle region. These routes may then be ordered according to some performance metric (e.g., actual download times) determined by periodic analysis (e.g., file download races) carried out locally by or under control of a given edge server.

According to another aspect of the present invention, a routing service may operate in one of two different modes: performance and failover. The performance mode continually polls the potential retrieval routes to rank their performance and uses the best route to retrieve content. The failover mode instructs the CDN edge server to go forward to the origin directly, but, in the event the direct route fails, to try one of the alternate routes. In the event the direct route fails, the alternate routes are tried in turn. This strategy need not use races to choose a route, because the direct route is to be used unless it completely fails to respond.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

As described above, it is known in the art to delivery HTTP, streaming media and applications over an Internet content delivery network (CDN or ICDN). The present invention may leverage Internet CDN architecture and functionality such as now generally described.

Figure 1:
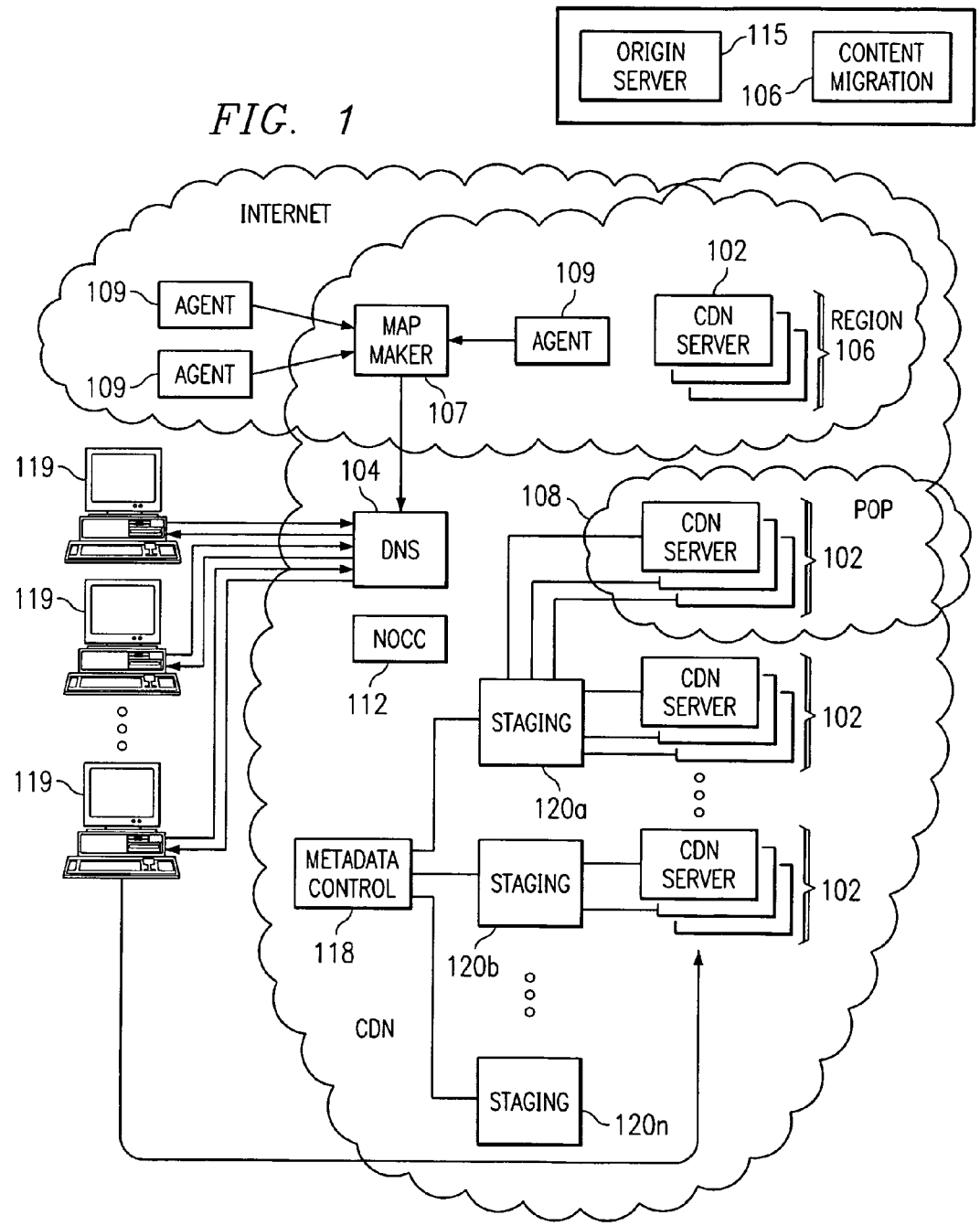
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions.

In one type of service offering, known as Akamai FreeFlow, from Akamai Technologies, Inc. of Cambridge, Mass., content is tagged for delivery from the CDN using a content migrator or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content.

Instead of using content provider-side migration (e.g., using the tool 106), a participating content provider may simply direct the CDNSP to serve an entire domain (or subdomain) by a DNS directive (e.g., a CNAME). In such case, the CDNSP may provide object-specific metadata to the CDN content servers to determine how the CDN content servers will handle a request for an object being served by the CDN. Metadata, as used herein, thus refers to the set of all control options and parameters for the object (e.g., coherence information, origin server identity information, load balancing information, customer code, other control codes, etc.), and such information may be provided to the CDN content servers via a configuration file, in HTTP headers, or in other ways. A configuration file is advantageous as it enables a change in the metadata to apply to an entire domain, to any set of directories, or to any set of file extensions. In one approach, the CDNSP operates a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

Figure 2:
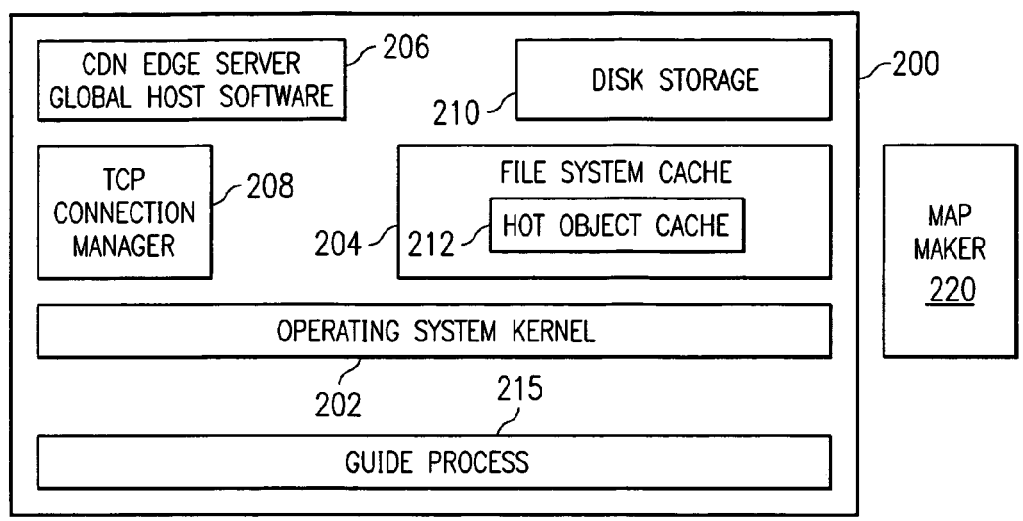
FIG. 2 is a simplified block diagram of a CDN edge server that is provisioned with a guide process for implementing certain functions of the present invention.

FIG. 2 illustrates a typical machine configuration for a CDN content edge server. Typically, the content server 200 is a caching appliance running an operating system kernel 202, a file system cache 204, CDN software 206, TCP connection manager 208, and disk storage 210. CDN software 206, among other things, is used to create and manage a "hot" object cache 212 for popular objects being served by the CDN. For HTTP content, the content server 200 receives end user requests for content, determines whether the requested object is present in the hot object cache or the disk storage, serves the requested object via HTTP (if it is present), or establishes a connection to another content server or an origin server to attempt to retrieve the requested object upon a cache miss. Generalizing, a cache miss can occur when the requested object is not in cache, when the requested object is in cache but is stale, when the requested object is non-cacheable, or the like. In all such cases, it may be necessary for the edge server to contact a content provider origin server to fetch the requested object. The present invention provides a technique for enabling the edge server to use an optimal path for that communication. To that end, CDN software 206 includes a guide process 215 that performs various functions to facilitate the optimized routing technique of the present invention. Generally, guide process 215 fetches a route map from a map maker process 220 (running elsewhere in the network), initiates performance metric tests (e.g., download races) on various routes identified in the map, collects and analyzes the results of those tests, and orders the routes accordingly so that the edge server can communicate with a content provider origin server via an optimal route whenever necessary. As used herein, "optimal" is not necessarily the best possible route in any kind of absolute sense; rather, it is a best route found given whatever constraints are then imposed on the network, various systems, connectivity constraints, and the like. The guide process is a computer program code, i.e., a series of program instructions, executable by a processor.

Generalizing, the present invention may be implemented as a routing mechanism, service or system in a distributed networking environment. One preferred environment is a content delivery network wherein the present invention provides improved connectivity back to an origin server for HTTP traffic. As noted above, a CDN service provider typically segments its servers into regions, with each region comprising a set of content servers (e.g., up to about ten (10) servers) that preferably operate in a peer-to-peer manner and share data across a common backbone such as a local area network (LAN). The inventive routing technique enables an edge server operating within a given CDN region to retrieve content (cacheable, non-cacheable and the like) more efficiently by selectively routing through the CDN's own nodes, thereby avoiding network congestion and hot spots. The invention thus enables an edge server to fetch content from an origin server through an intermediate CDN server or, more generally, enables an edge server within a given first region to fetch content from the origin server through an intermediate CDN region. As used herein, this routing through an intermediate server, node or region is sometimes referred to as "tunneling."

The present invention identifies alternate paths from a CDN edge server to an origin server and uses these alternates to either improve the performance of content delivery, or to provide for fail-over in the event that the direct route is congested or otherwise unavailable. When an edge server contacts the origin server, the "direct" route typically is the route obtained through the Border Gateway Protocol (BGP). When the inventive routing technique is used, in contrast, alternate routes to the origin server are accessed by sending the request from the edge server to another intermediate (preferably CDN-managed) server/region before going to the origin. While one might assume that adding the intermediate step would reduce performance, it frequently improves performance, because CDN servers and regions typically are well-connected, and the indirect route can often bypass network congestion.

Figure 3:
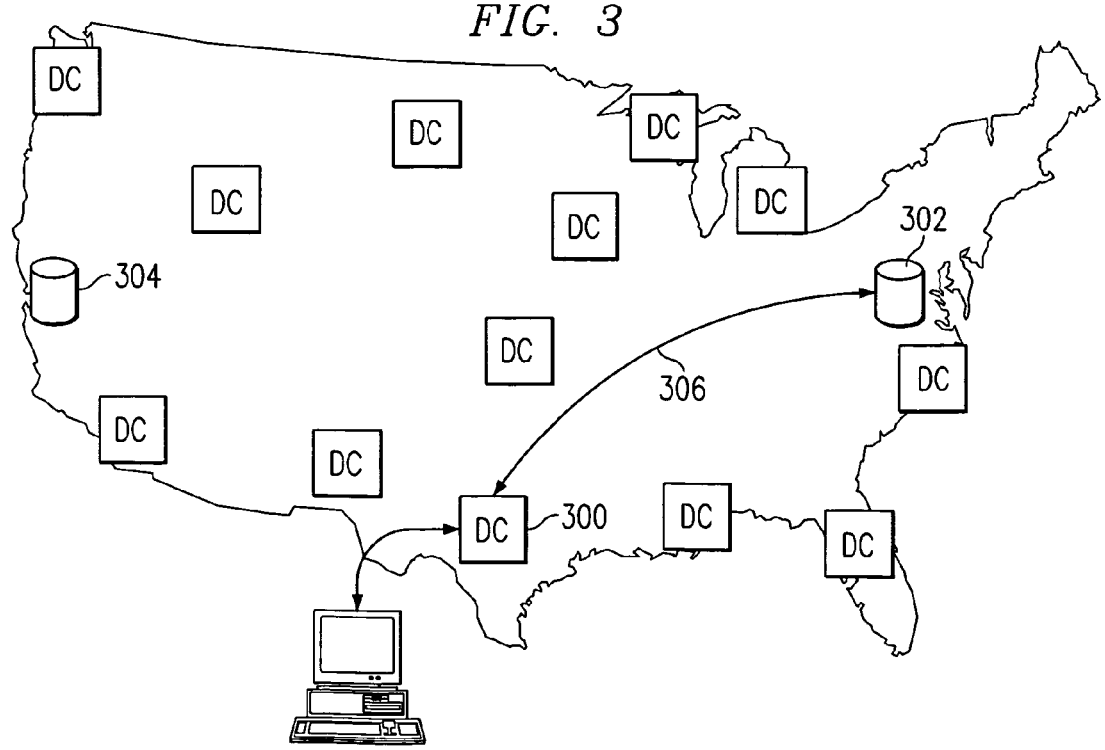
FIG. 3 is a simplified illustration showing how an edge server in a content delivery network fetches content from a content provider origin server without use of the present invention.
Figure 4:
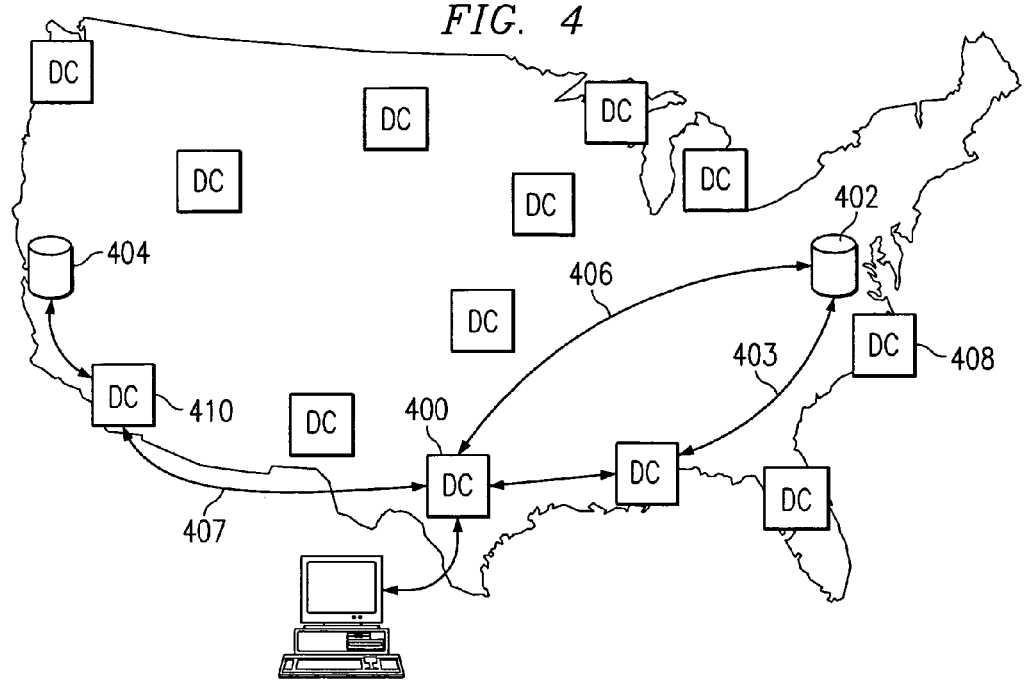
FIG. 4 illustrates how the present invention may be used to enable the edge server to fetch content from the content provider origin server over one or more alternative routes that may each include an intermediate CDN node.

Preferably, given CDN edge servers are configured with a plurality (e.g., at least two) alternate routes to use in addition to the direct route to the origin. These intermediate servers preferably are specific to the given edge server and origin server to be contacted. FIGS. 3-4 illustrate the basic concept of routing through intermediate CDN regions according to the present invention. In FIG. 3, an end user request is directed (e.g., through a DNS request routing mechanism) to an edge server located at a datacenter 300 in Texas. In this case the content provider is operating mirrored origin servers at a datacenter 302 on the East Coast, and at a datacenter 304 on the West Coast. In a typical scenario, the edge server connects to the datacenter 302 over a direct connection 306 if it becomes necessary to fetch content from the origin server. In FIG. 4, in contrast, a pair of alternative routes is made available to the edge server. One alternative route 402 uses region 406, which is located intermediate of the datacenter 402 and the datacenter 400 to which the end user was originally directed. Another alternative route 408 uses region 410, which is located intermediate of the datacenter 404 and the datacenter 400. In the example shown in FIG. 4, there are thus three (3) routes over which the edge server in datacenter 400 can fetch the desired content from the origin server: over the direct connection, over route 402, or over route 408. According to the invention, one of these routes is selected as optimal, preferably by having the edge server evaluate some given performance metric, such as file download time. The various alternative routes are exposed to the edge server in a map that is published by a (preferably global-based) map making process. Preferably, a given map is specific to a given customer and to the specific region at which the initial request is received from an end user.

Figure 5:
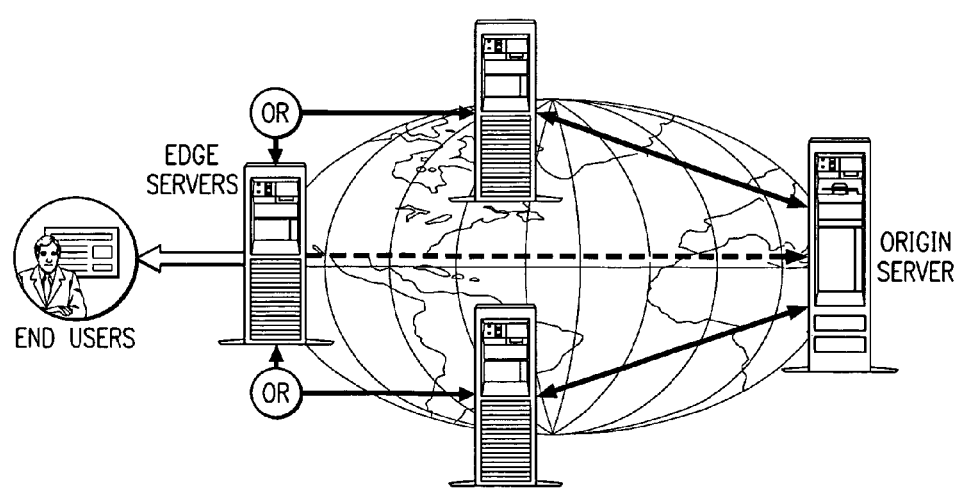
FIG. 5 is a simplified diagram of how the present invention operates in a performance mode.
Figure 6:
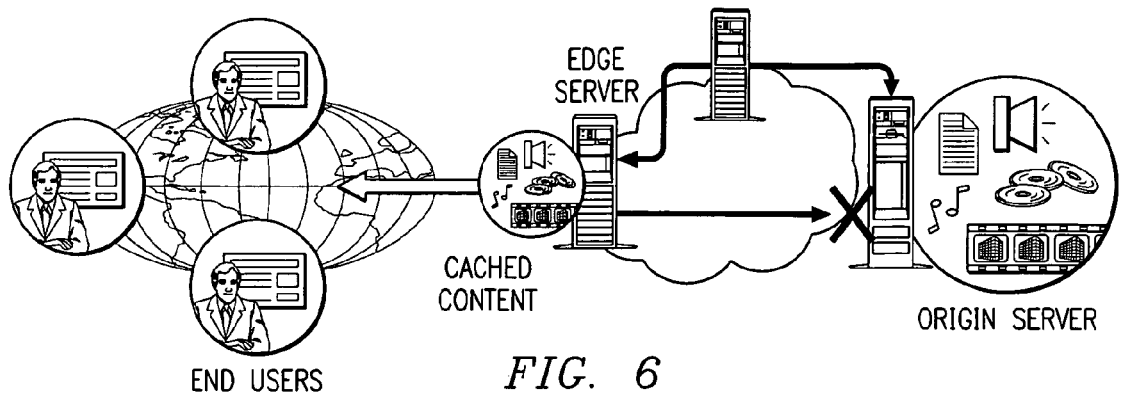
FIG. 6 is a simplified diagram of how the present invention operates in a failover mode.

The routing system of the present invention may operate in one of two basic modes. In a performance mode, illustrated in FIG. 5, an edge server provisioned with the guide process carries out periodic races to find the fastest route to the origin server. This ensures that content required by (but unavailable from) the edge server is delivered from the origin server in the quickest fashion. In a failover mode, illustrated in FIG. 6, the edge server automatically detects when the route to the origin server is inaccessible and invokes the routing service to find an alternative route to reach the origin server. The failover mode enhances reliability of the overall content delivery network, and ensures that even dynamic, uncacheable content can always be delivered.

Preferably, the intermediate servers that are available for alternative routes between a given edge server (or region) and a given origin server are updated frequently (e.g., every 15-30 minutes) based on the current performance of connections between CDN servers.

In the preferred embodiment of the invention, the choice of which route an edge server should use to reach a given origin server preferably is made in three phases, which are described below: (a) a map of potential alternate routes is created (preferably by a global-based process called a mapmaker); (b) current ping data is used to identify the two best alternates for each CDN edge server (again, preferably by the mapmaker); and (c) each CDN edge server chooses among the direct route and the alternate routes based on the current actual performance with real requests for content. In particular, in a preferred embodiment, the CDN edge servers use occasional "races" among identical requests to determine which of the plurality (e.g., typically three (3)) possible routes is performing the best and then choose the route to use when going forward for the current and future requests. As will be described below, the parameters for these races are highly configurable to optimize the performance for the type of content being served and the intended result.

Before the inventive routing service is enabled for a given site, a large number (e.g., up to 100 CDN server regions) are identified as potential intermediate servers. These regions may be chosen on any available network performance metrics, e.g., such as analysis of ping data between CDN edge servers and well-connected CDN core servers and from these core servers to the origin. Once intermediate servers have been identified, they are used to define a "map" from CDN edge servers and the origin server. The invention preferably uses a custom map for each site because sites are hosted all over the Internet, on different backbones and in different geographic locations. As a result, the indirect routes that result in the best behavior are different for each CDN customer that uses the routing service. The indirect routes are then ordered such that the intermediate servers that provide the best performance for each given edge server are listed first. Notice that in the preferred embodiment the indirect routes are specific to each edge server and each customer origin server. The mapping is updated frequently (e.g., approximately every 15-30 minutes) based on current ping data to ensure optimal performance. When a CDN edge server requests its current map (preferably via a DNS lookup on a given routing service domain), it receives a given number (e.g., the two) top performing routes as alternates. The edge server then chooses among these alternate routes and the direct route by occasionally testing the performance of each connection, e.g., with a request for content.

As noted above, the inventive routing service preferably determines which route is the best at any given time by performing "races." These races consist of having the edge server forward a client request through the a given number (e.g., three (3)) available routes simultaneously and observing which route performed the best in serving the request. The information is then used to choose the primary route for future requests. Moreover, that route preferably remains the primary route until the next race is conducted. These races allow the routing service to react to changes in the Internet very quickly. A race preferably is initiated upon arrival of a request from an end user, and the CDNSP preferably configures how often a race will occur by setting one or more of the following preferred parameters: (a) the minimum amount of time that should elapse between races (with a default to, e.g., 30 seconds); (b) the minimum number of client requests that should arrive before each new race (with a default to, e.g., 40 requests); (c) the maximum amount of time that should elapse between races (with a defaults to, e.g., five minutes). The last parameter ensures that a race will occur at least this often and thus ensures that the best route is the one being used.

According to the invention, races are configurable to use either the actual object requested by a client (called a Request Object) or a predetermined test object on the origin server (called a Test Object), or both. Request Object races are generally preferable to Test Object races because the end user client that initiated the Request Object race can take advantage of the results, in particular, because the end user is served from the route that provided the fastest first-byte turn-around time. However, there are some cases where Request Objects are not possible and Test Objects are a good alternative. A Request Object race uses the object requested by the end user as the object it requests from the origin server. That is, if a browser requests ...://us.a1.yimg.com/us.yimg.com/i/ww/m5v5.gif, the CDN edge server will request ...://us.yimg.com/i/ww/m5v5.gif from all three forward servers. When this type of race is used, one may also configure a maximum number of bytes that should be downloaded through the losing routes. For example, the default configuration is to download up to 56K of data on the losing routes and then terminate the connection(s). The entire file is downloaded from the winning route, because this response is served to the end user client. The race preferably is scored based on the performance retrieving the 56 Kbytes of data, although this is not a limitation of the invention.

Races that use Request Objects may cause a problem for some sites because the origin server will receive three identical requests. If these requests impact billing or initiate some backend transaction, several anomalies many occur. A Test Object race uses an object specified in metadata as the object requested from the origin server across the three routes. The benefit of this is that the Test Object can be a special object that does not impact the origin server's logging or initiate backend transactions.

The edge server scores the races preferably based on three measurements: Request End Time; Turnaround Time (the first byte returned); Turnaround Time (the first byte returned). One can apply weightings to these measurements to influence the final scoring. For example, one could weight the transfer time more heavily to ensure that a rapid first byte score from a route would not erroneously determine the choice of the optimal route for fairly large files. Once the individual races have been scored, the CDN edge server compares those scores to choose the best route. Just as it is possible to weight one of the measurements in determining the score for the routes, it is also possible to favor the direct or indirect routes depending on the desired result. Normally the direct route is favored over the indirect routes. One could specify that, to be chosen, an indirect route must be faster than the direct route: by a given percent; by a specific number of milliseconds; by a given percent and an absolute number of milliseconds, or some combination thereof.

As noted above, the routing service operates in one of two modes: performance and failover. The performance mode continually polls the potential retrieval routes to rank their performance and uses the best route to retrieve content. The strategy preferably comes in two versions: origin-weighted and indirect-weighted. The origin-weighted strategy weights going direct to the origin as slightly more favorable than taking the indirect route. The indirect-weighted strategy favors the indirect route over the direct route to the origin server. This can be useful in providing a buffer for the origin server, while still allowing for direct contact to the origin in the event that the parent server is not providing sufficiently better service. The failover mode instructs the CDN edge server to go forward to the origin directly, but, in the event the direct route fails, to try one of the alternate routes. In the event the direct route fails, the alternate routes are tried in turn. This strategy need not use races to choose a route, because the direct route is to be used unless it completely fails to respond. The alternate routes preferably are determined based on the ping data and are listed in the order that they should be used.

Normally the CDN edge server will try to reach the origin server a given number of times with a specified timeout for each attempt. This timeout may be generally fairly long (several seconds), to ensure that a congested route does not cause the timeout to be triggered unnecessarily. When the inventive technique is enabled, each attempt to reach the origin server for a given request may involve trying the three possible routes in sequence as the connection attempts timeout. Because there are three routes to try, the timeout for each attempt can be relatively short (one second) in the hope that the timeout is a problem with the route, and not with the origin server. Only after all three routes have failed does the CDN edge server then attempt to reach the origin directly with the normal full-timeout. The logic being that if all routes have timed out, the problem is not likely to be a congested route, and it may be necessary to give the origin server more time to respond to the connection attempt. If that final connection attempt times out, the CDN edge server can initiate the fail-action to serve an error, serve default content, or retrieve content from an alternate origin server.

Figure 7:
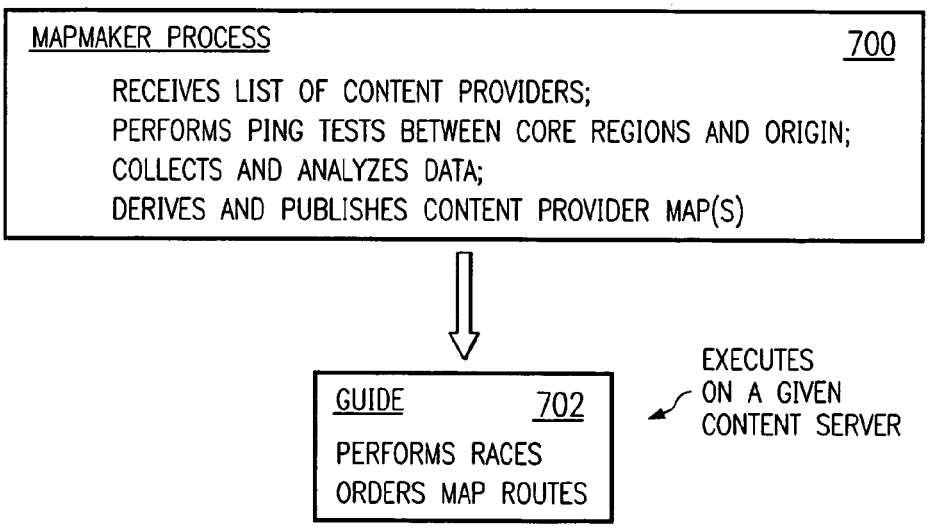
FIG. 7 is a simplified diagram of the modules that comprise the routing system of the present invention.

Referring to FIG. 7, the routing system has two basic modules that are now described: a mapmaker 700, which resides in a small number of preferably well-located regions (three to six regions) and that has a global view of the network, and the guide 702, which is integrated into each provisioned edge server and that gives the edge server a more precise, but local view of the network. The mapmaker 700 is responsible for collecting information and computing the best routes to get to content providers from each of the CDN regions. It makes the best route information available to other mechanisms in the CDN network. These routes preferably are computed based on ping data from a subset of the CDN regions, which may be referred to as "core" regions. These regions are the candidate intermediate regions for the tunneling operation. Preferably there are multiple mapmaker machines, with each machine being a server running commodity hardware and operating system software. The mapmaker machines are dynamically configurable. Preferably, they receive a file that specifies the content providers for which maps should be built, and the information about the content provider necessary to build a map. This information includes, for example, a list of datacenters and pingable IPs for that datacenter, whether by name, IP address or ping equivalency with existing CDN regions. Further information about the content provider may include reverse proxies, a serial number, a metric to be used in computing distances, the number of alternative routes to provide, and other configuration parameters. The information for each content providers forms what is sometimes called a strategy. One strategy may be used for more than one actual content provider: an example might be a generic strategy for a company which delivers content out one site and another in a mirror site. On the other hand, one content provider may have one strategy for HTML and another for images.

Preferably, the datacenters that are usable as intermediate regions are set on a per strategy basis. Candidate regions may be removed for various reasons, e.g., the region is disabled, the region is at or near a given load capacity, or the like, and it may be desirable to allocate given intermediate regions to given customers.

Figure 8:
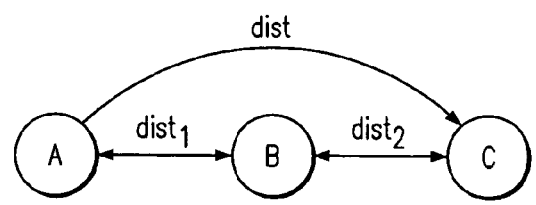
FIG. 8 illustrates how a shortest path may be computed between a pair of nodes in a network.

The mapmaker constantly gathers liveness as well as ping data about the CDN regions. For example, a given agent in the CDN pings at least one edge server per region, and one IP address per each datacenter listed in the strategies. The mapmaker relies on the ability to predict how good a path is based on ping data. Ping latency and ping loss between pairs of regions may be used to compute value that is considered the effective distance between those two regions, or some other convenient estimate may be used. It is assumed that pings are symmetric with respect to pinger and pingee as illustrated in FIG. 8. In particular, FIG. 8 illustrates three (3) regions A, B and C. In computing paths, a question arises as to whether the distance "dist" between region A and C should be: $L_1=dist_1+dist_2$, $L_2=(dist_1^2+dist_2^2)^{1/2}$, $L_{infinity}=\max\{dist_1, dist_2\}$, or some other metric, where $dist_1$ is the distance between regions A and B and $dist_2$ is the distance between regions A and B. For the sake of understanding how these distances should be combined to infer the distance through a middle region, it is assumed that there is no ping loss. In this case, the latency incurred by tunneling through an intermediate node should be the sum of the ping times plus a retransmission time for processing at the intermediate node. However, when moving an arbitrarily large file, then it has been found that the maximum of the download times between the two pairs of regions is a good estimator of the time required to transfer the file, since the actual transfer can be "pipelined." Instead of using either of the two extremes (the $L_1$ and $L_2$ metrics), a good estimator for the transmission latency may be the $L_2$ norm. $L_{1.4}$ strikes a good balance between the two extremes.

For each content provider the mapmaker logically generates a number of maps, which can be identified as follows: Closest CP Map: the domain name of the closest mirror site for the content provider; Closest Reverse Proxy Map: the domain name of the closest reverse proxy if one exists; and Best Two-Hop Map: a list of usually two parent regions that should used to reach the mirror site. The first two maps are very similar in nature—they map each region to the closest possible source of data for each content provider. The Closest Reverse Proxy Map is not needed if there is no reverse proxy. Other factors can affect the choice of paths for the Two-Hop map. In general terms, the Two-Hop map encodes the two (or more) shortest paths from each region to mirror site of the content-provider, that go through at most one (active) middle region. The regions that can be used as an intermediate hop in the paths are usually the same regions that do the pinging, but the intermediate hop can also be explicitly specified as a subset of those regions.

As noted above, preferably the mapmaker relies on ping data as opposed to information about the actual download times each region experiences, or even what paths are actually used by the region to perform downloads. That information preferably is kept locally at each region. The guide process is the component within the edge server responsible for deciding which of the possible paths should be used. An edge server that is provisioned for the routing service thus includes the guide process, which is typically software. More generally, the guide computes an ordering or list of the possible paths/parents that could be used to obtain the content. The edge server tries parents in order: if a parent fails or times-out then the edge server will request content from the next parent. If the routing service is enabled for a given site and the edge server receives requests for data in that site, the edge server will occasionally, while responding to the request, measure the performance of a given number (e.g., three) simultaneous downloads from that site: one directly from the content provider, and a plurality (e.g., two) from the intermediate regions suggested by the two-hop map published by the mapmaker. The edge server then uses the results of this test to estimate which route should be used to access that site, until a new test occurs. If a long time elapses without a test, the previous results expire. It may also be desirable to allow for the downloads between tests to affect the predicted quality of each of the routes, thus allowing for an even faster response time to a network problem, without requiring additional tests.

When a request comes in and is not purely cacheable, it results in the download of a file from the content provider. This is what is sometimes called a forward request. On forward requests for sites that are provisioned to use the routing system and service, the results of the previous test are used to choose the route for the download. The exceptions to this rule occur if the content can be and is itself used for a test or if there are no recent test results available. In the first case, the download preferably occurs through all (e.g., three (3)) routes, and the one that returns the first byte faster will be used to serve a client. The other two will have their results recorded and will be allowed to proceed for up to 56 k bytes, after which they will be aborted. If however, the content cannot be used for a test and there are no recent test results available, a default ranking is used to decide on which route to use. The default order can either specify that the direct or the indirect route should be favored.

Preferably, tests are linked to a forward request, meaning they do not happen if there has been no forward request to that site. In the case of a forward request, a test is by default preferably run when: no test occurred in a given number of minutes, or at least a given number of seconds have passed since the last test, or if at least a given number of forward requests from this site did not result in tests. These settings try to ensure that for a site with a reasonable amount of volume there will always be fresh statistics for the download paths while at the same time limiting the amount of testing that is performed over the network as a whole.

Once a decision is made to use the routing service, one must also decide on what map to use. Preferably, the CDNSP creates a new strategy for the customer's site. Once the mapmaker machines receive the new strategy, they update their list of pingees, start collecting ping data for the updated list, and start producing maps for the additional strategy. Once a map is being published for the site, the routing service is enabled for the site. When an edge server receives a request that results in a forward request, the edge server has to decide what route to take.

As noted above, preferably the CDN includes a metadata transmission system. Metadata can be used to control the routing service, as is now described. Some representative metadata tags that may be used are listed below, with a brief explanation of their meanings:

| Metadata Tag | Meaning |
| --- | --- |
| use-hierarchy | the map that should be used |
| cdnroute-test-object-url | url to be used in tests |
| cdnroute-use-test-object | test-objects should be used, i.e., tests should use the selected url |
| cdnroute-max-time-before-tobj | desired time between tests |
| cdnroute-direct-scale | ratio between direct and indirect test results before indirect is used |
| cdnroute-non-tail-connect-timeout | time before routing fails-over to another parent if it cannot connect |
| cdnroute-direct-at-end | specifies if indirect should be favored in the absence of tests results |

Thus, to provide an illustrative embodiment, the use-hierarchy tag is first enabled to enable the routing service to take effect, e.g., with default settings. In addition to the use-hierarchy tag, the following metadata tags (among others) could then be set to configure the routing service for the best performance:
<md name="cdnroute-non-tail-connect-timeout">1</md>
<md name="cdnroute-direct-scale">95</md>

As noted above, the inventive routing service can be configured in a failover mode that does not use performance testing. In such case, the edge server is given three parents: that of the content provider (direct) and two indirect routes. In failover mode, the edge server contacts direct first. If for some reason this connection fails, the edge server will try its first parent, then its second parent, and finally back to direct. Because the mapmaker is constantly publishing up-to-date indirect routes, these failover servers are likely to serve the content successfully. When failover mode is used, the configuration may include a metadata tag for disabling test clients:
<md name="cdnroute-no-test-client">on</md>.

The following provides additional detail regarding how to configure races in the performance mode. Preferably, races for a given route strategy occur when the edge server receives a request for content configured to use that strategy. When a request arrives, the server preferably looks at two pieces of data: the amount of time since the last race for this strategy, and the number of connections since the last race for this strategy. There are preferably three (3) conditions that can be applied (e.g., via metadata) to these two pieces of information:

cdnroute-max-time-before-tc: The maximum amount of time before performing a race (default: 5 m): <md name="cdnroute-max-time-before-tc">500</md> cdnroute-max-req-before-tc: The maximum number of requests after which a race will be performed (default: 40): <md name="cdnroute-max-req-before-tc">1000</md> cdnroute-min-tc-period: The minimum amount of time that must have elapsed before performing a race (default: 30 s): <md name="cdnroute-min-tc-period">120</md>.

Request Object races use the client request for the test client and use the settings above to control the frequency of the races. In addition to these settings, there may be additional tags for controlling the use of request object races. For example, a tag such as racer-max-byte takes as its value a number in bytes from 0 to 2 MB. It defaults to 56K and may be set as follows: <md name="racer-max-byte">32000</md>. This metadata limits the amount of data downloaded by the losing routes when a race is performed. The following header will cause the inclusion of a header binding the test client requests together so that the duplicate requests can be identified as such: -CDNSP-TC-Identifier: t[co]-<IP>-<edgeserver_curtime>-<incrementing counter>. The initial string is "tc" for test clients and "to" for test objects. Test objects are like request objects, except the URL being requested is replaced with a fixed URL configured through metadata. The following is an example of how to set this up:
<md name="cdnroute-use-test-object">on</md>
<md name="cdnroute-test-object-url">http://www-es1.customer.com/cdnroute/test_object.txt</md>
<md name="cdnroute-use-my-metadata">on</md>

An illustrative technique for scoring the races is now described. This description is merely representative. The score for each of the routes is made up of the request_end_time, the turnaround_time and the transfer_time. These times are multiplied by their specified weights and then summed. Each of the items may be weighed using a separate metadata tag and, preferably, each of these tags has an equivalent value. In this example, the cdnroute weighting tags all take as their value a number between −20 and +20. The default setting is one "1".
cdnroute-ret-weight—Request End Time Weighting
<md name="cdnroute-ret-weight">0</md>
Default is 0
cdnroute-tt-weight—Turnaround Time Weighting (first byte)
<md name="cdnroute-tt-weight">1</md>
Default is 1
cdnroute-xt-weight—Transfer Time Weighting
<md name=cdnrout-xt-weight>1</md>
Default is 1

The cdn route-direct-scale tag is used to apply a weighting to the total score for the direct route. This value of the tag is a number, and it works like a percent. The scores of the indirect parents are automatically multiplied by 100, so a number less than 100 will decrease the score for the direct route relative to the other routes and make it more likely to be chosen. For example, setting the value to 50 will favor the direct route twice as much as the indirect route. A setting of 120 would favor the indirect routes. The tag may be configured as follows: md name="cdnroute-direct-scale">100</md>. The cdnroute-direct-scale takes as its value a number between 0 and 255. The default value is 100, but 95 is a useful value.

The cdnroute-absolute-direct-scale tag takes a number from −2000 to +2000 that represents a number of milliseconds. This is normally set to 10. The number is an offset that is subtracted from the direct route score to ensure that the indirect route must be at least this amount better than the direct route before it is chosen as the best route.

One of ordinary skill in the art will appreciate that the technique of tunneling through an intermediate CDN node for the purpose of faster and more reliable region-to-origin server may be extended to facilitate region-to-region communication. Each CDN server for a given client request may play one of three different roles: edge-server, middle-server or root-server. An edge-server is a server receiving an HTTP request from a client. A root-server is a CDN server that retrieves the content directly from the content provider origin server. Thus, a root-server may be co-located or located near a content provider origin server, although this is not a requirement. Any CDN server node that lies between the edge-server and the root-server is a middle-server. These CDN servers simply forward packets between the edge and root servers, i.e., a child CDN server and its parent CDN server.

Consistent with the methodology described above, the following are representative steps that would take place after an edge-server gets an HTTP request from a client. First, the edge-server determine a list of parent IP addresses as well as an IP address for the content provider origin server. In an illustrative embodiment, such information is obtained from a map generated by a mapmaker machine. To obtain the map, the edge server preferably issues a name query (i.e., a DNS lookup). Any convenient domain name construct can be used to direct the requesting server to a given map for a given CDN customer. Then, the edge server determines if it is to apply a race and/or Rsync to the request. If a race is used, the client becomes a VIP-client. Based on how long it has been since the edge server has picked a VIP-client, the edge server determines if this client will be a VIP-client or not. As noted above, certain rules or policies may be used to determine whether the edge server picks the client to be a VIP-client. Thus, for example, the request may be considered to be from a VIP-client according to the following constraints: (a) if a VIP-client has been picked for this content provider in the last 30 seconds, do not pick this client; (b) if no VIP-client has been picked for this content provider in the last 5 minutes, pick this client; (c) if no VIP-client has been picked for this content provider in the last 40 downloads, pick this client; (d) for large downloads ensure that the network is not overloaded by aborting a download after the first 56 Kbytes are received over a particular route. Of course, the above rules are merely exemplary.

It is assumed that parent zero is a root-server. The edge-server preferably keeps a running average of download times per content provider and parent over the VIP-client downloads. If the client is a VIP-client, the edge-server will download a copy of the file from all or some number of the parents. It preferably returns the first file to arrive to the client and records the time for each of the downloads. This information is then used in the running averages. If the client is a normal client, then the edge-server picks the parent with the best estimator that is computed from the running averages. If the content provider is multi-homed, it has servers in more than one location. In such case, the edge-server will use a default method provided by the content provider to determine the closest home.

As described above, a Closest Reverse Proxy Map may be used where the CDN service provider maintains reverse proxy regions. This map may be generated as follows. Let $\acute{R}$ be the list of RootProxy regions for some content provider. For each region R, consider all two-hop paths from the region R to some region in $\acute{R}$. Return the shortest two such paths. Not all two-hop paths are considered. Let D be the distance from R to the closest RootProxy. Discard a path R? R1? R2, if one of the following is true: (a) $0.8 \times D < \text{Dist}(R_1, R_2)$ (b) $1.2 \times D < \text{Dist}(R, R_1) + \text{Dist}(R_1, R_2)$.

The following algorithm may also be used to estimate the distance between regions. To adjust ping time and ping loss into a distance, use the following $\text{Dist} = (100/(101 - \% \text{Loss}))^2 \times \text{pingTime}$. This formula has the following effect: for a 10% loss, increase the ping time by 20%; for a 20% loss, increase the ping time by 50%; for a 30% loss, increase the ping time by 100%. If desired the ratio above may be cubed instead of squared.

The tunneling technique provides a significant (e.g., two times) decrease in average file download time. Although not required, preferably the tunneling technique is coupled with a data compression and difference algorithm so that the number of bytes transmitted from a root-server to an edge-server is also reduced. A representative algorithm for this purpose is Rsync, although other such algorithms may be used. The use of Rsync (or a similar approach wherein file differences are transmitted) decreases bandwidth used on expensive longhaul links and provides addition reduction in download time due to the smaller file sizes being transmitted.

The present invention provides numerous advantages. The inventive techniques are especially useful for any CDN customer seeking to optimize performance in content delivery and for many customers interested in improved reliability. The performance benefit is greatest when the connection from an edge server to the customer's origin is frequent, because this is the transfer that is optimized by the present invention. This applies regardless of whether the connection is used to transfer an entire file or an If-Modified-Since request to revalidate content or authorize a request before serving the client. Specifically, any content that uses dynamic content assembly, no-store, bypass-cache, centralized authorization, zero-TTL or low TTL settings, is a good candidate for use of the techniques described above. Of course, the above is merely illustrative and should not be taken to limit the scope of the present invention in any way.

One of ordinary skill in the art will appreciate that the inventive technique for tunneling data from the content provider origin server (or a reverse proxy) to the edge server is not meant to be limited to data transfers in one direction. There are many instances where data transfer will go from the edge server to the origin, e.g., when an application executing on the edge server provides data to the origin. Thus, the inventive technique should be considered bi-directional or unidirectional.

As described above, the present invention is not limited to use of file download races to prioritize the set of routes that are exposed in a given content provider map. Other performance metric tests may be used in addition to or in lieu of the file downloads. For example, a simple liveness check may tell the edge server that a given route identified in the map is no longer active. Moreover, other well-known techniques may be used to determine which path (either direct or indirect) is the best or optimal one for edge server to origin/proxy server (or vice versa) communications. Such additional methodologies may be used to select the optimal routes include, without limitation: analysis of BGP data, analysis of historical TCP/IP statistics, measurements conducted as a result of exchanges of data between regions, additional network statistics generated from traceroutes, pings, udp traffic, and combinations of the above.

One of ordinary skill in the art will appreciate that "tunneling" as used herein is distinct from the concept of Internet Protocol (IP) packet encapsulation, such as described in RFC 1048 (1994). In RFC 1048, a "tunnel" is created through a given node by encapsulating the data to be transferred in another packet and then sending the packet. As described herein, "tunneling" does not necessarily move data from point A (the edge server) to point B (the origin server) directly, as typically content does not pass through the intermediate node (e.g., on a path from point A to point B); rather (and because the CDN typically operates as an overlay on top of other networks), when the intermediate CDN node receives a request from the edge server, it creates a new request, and then the intermediate CDN node sends the new request forward to the origin server. Thus, as used herein, a "route" (e.g., between a CDN server and an origin server) may also be described conveniently as a "path."

Having described our invention, what we now claim is set forth below.

The invention claimed is:

1. A method operative in a content delivery network having a set of server nodes organized into regions, wherein the server nodes provide delivery of content on behalf of participating content providers, comprising:

for a given content provider origin server, generating a map identifying a set of alternate paths that may be used for edge server to content provider origin server communications, wherein the map identifies a set of alternate paths, and wherein each alternate path includes at least one content delivery network server node;

upon receipt at a particular edge server of a request for an object, determining whether the object is available for delivery from the particular edge server;

if the object is not available for delivery from the particular edge server, selecting a path over which the particular edge server should go forward to the content provider origin server to attempt to obtain the object, wherein the path is selected from one of the alternate paths identified in the map; and issuing a new request for the object from the particular edge server over the path.

2. The method as described in claim 1 wherein the new request is issued to the content delivery network server node on the path.

3. The method as described in claim 1 wherein the object is content that is generated at the content provider origin server or is non-cacheable at the particular edge server.

4. The method as described in claim 1 wherein the path over which the particular edge server should go forward to the content provider origin server is valid for a given time period.

5. The method as described in claim 1 further including periodically updating the map to reflect changing Internet conditions.

6. The method as described in claim 1 wherein the path is determined by the particular edge server as a result of performing a performance test.

7. The method as described in claim 6 wherein the performance test comprises a race, wherein the race comprises downloading a file to the particular edge server over at least the alternate paths.

8. The method as described in claim 7 wherein the race is executed by the particular edge server upon receipt of the request for the object.

9. The method as described in claim 8 wherein the file that is downloaded during the race is also the object.

10. A method operative in a content delivery network having a set of content servers organized into regions, wherein the content servers provide delivery of content on behalf of participating content providers, and wherein a given content provider origin server may be reached over a set of paths including a default BGP path and a set of alternate paths, wherein at least one path of the set of alternate paths includes an intermediate content delivery network content server, comprising:

for each of a set of participating content providers, provisioning the content servers in the content delivery network to enable the content servers to fetch content from the participating content provider's origin server over an alternate path of the set of alternate paths instead of using the default BGP path;

upon receipt at a content server of a request for an object, determining whether the object is available for delivery from the content server;

if the object is not available for delivery from the content server, issuing a new request for the object from the content server, wherein the new request is issued over one of the alternate paths;

receiving the object at the content server over the alternate path; and serving the object from the content server.

* * * * *